United States Patent [19]

Ichida et al.

[11] 4,220,967
[45] Sep. 2, 1980

[54] SCENE TRACKER USING MULTIPLE INDEPENDENT CORRELATORS

[75] Inventors: LeRoy F. Ichida, Canoga Park; Robert A. Sturla, Northridge; Jacob M. Sacks, Thousand Oaks, all of Calif.

[73] Assignee: Hughes Aircraft Company, Culver City, Calif.

[21] Appl. No.: 727,101

[22] Filed: Sep. 27, 1976

[51] Int. Cl.$^2$ .............................................. H04N 7/18
[52] U.S. Cl. ................................... 358/105; 358/125
[58] Field of Search ........................ 358/125, 126, 113; 343/5 MM, 5 VQ, 100 CL; 235/181

[56] References Cited

U.S. PATENT DOCUMENTS

| | | | |
|---|---|---|---|
| 3,794,272 | 2/1974 | Hecker | 343/5 MM |
| 3,805,261 | 4/1974 | Deschamps . | |
| 3,828,122 | 8/1974 | McPhee et al. | 358/126 |
| 3,829,614 | 8/1974 | Ahlbom et al. | |
| 3,943,277 | 3/1976 | Everly et al. | |
| 4,025,718 | 5/1977 | Paretti | 358/125 |
| 4,106,726 | 8/1978 | Emmons et al. | |
| 4,164,728 | 8/1979 | Marsh . | |

FOREIGN PATENT DOCUMENTS

2339869 8/1977 France .
1515295 6/1978 United Kingdom .
1533935 11/1978 United Kingdom .

OTHER PUBLICATIONS

Proceedings of the IEEE Naecon 78, C. Reed et al., Range Correlation Guidance for Cruise Missiles, pp. 1255-1262.

M. Feilmeier, Parallel Computers–Parallel Mathematics, Proceedings of the IMACS (AICA)-G1 Symposium, Mar. 14-16-1977, North-Holland Publishing Company, pp. 247-256.

Primary Examiner—Theodore M. Blum
Attorney, Agent, or Firm—Gerald J. Woloson; W. H. MacAllister

[57] ABSTRACT

A scene tracker for use with imaging or quasi-imaging sensors such as TV cameras, FLIRS, millimeter-wave scanners, or the like is disclosed. Specifically, the invention is concerned with a form of correlation tracking. At the start of a track mode, part or parts of a scene are stored in a memory. Every subsequent video scan is then compared with the scene or parts of the scene stored in memory to find the "best match" between live data and stored data. This process generates signal output proportional to horizontal and/or vertical translations of the scene. Besides pure translation, the disclosed scene tracker is capable of tracking an original aim point in the presence of scene rotation, scene growth (zooming), scene reduction (dezooming), distortion, and/or partial scene obscuration. Special novel features of the invention include a multi-cell correlation principle; a novel method of computing and storing correlation functions for each cell; a method to derive weighted average displacements for the entities of all cell correlations; and a novel video signal processing technique.

11 Claims, 18 Drawing Figures

SCENE TRACKER USING MULTIPLE INDEPENDENT CORRELATORS

BACKGROUND OF THE INVENTION

1. Field of the Invention

This invention relates generally to trackers for use with imaging or quasi-imaging sensors such as TV cameras, FLIRS, millimeter-wave scanners, or the like. More particularly the invention is concerned with correlation scene tracking using multiple independent correlators.

2. Description of the Prior Art

To the applicants' knowledge, no correlator tracker in existence today implements the special features of the invention, much less all four in a single system.

SUMMARY OF THE INVENTION

Objects

An object of the present invention is to provide a new programmable stored program correlation tracker having the unique capability of tracking simultaneously in multiple modes.

Another object of the invention is to provide a correlation tracker incorporating real time scene correlation capability which can track an entire scene with or without specific target content.

A further object of the present invention is to provide a new programmable stored program correlation tracker in which tracking algorithms may be modified or exchanged during real time tracking without interruption of tracking.

A further object of the present invention is to provide a programmable stored program correlation tracker having areas of application including air-to-surface seekers, air-to-air seekers incorporating automatic acquisition, clutter discrimination, counter-counter measures, and terminal aim point determination, fire control, scene stabilization, and other applications.

The invention represents the latest state of the art in tracker design for use in TV, IR and radar imaging seekers. Since the invention is of the programmable stored program type, its heart is the central processing unit. The correlation tracker of the invention is capable of tracking simultaneously in several functional modes. Such is its power and flexibility that its tracking algorithms can be modified or replaced during real-time tracking operations without interrupting the continuity of tracking. In addition, the tracker can be programmed to make decisions and select algorithms as a function of prestored criteria.

In an air-to-air TV or imaging IR seeker application, the combination of scene correlation with sophisticated gated video tracking techniques can provide automatic target acquisition of point-like targets having no resolvable features at the acquisition range by moving-target detection techniques. For instance, the correlation tracker can handle a terminal guidance problem with an acceptable small blind-range limitation. In an air-to-ground TV or IR seeker application, all tracker functions can be accommodated, including the use of correlation tracking to reacquire a target after a transient-induced loss of lock, and blind-range reduction through correlation terminal tracking. The tracker of the invention can accomplish automatic bore-sighting of two seekers with not necesarily equal fields of view or even identical scan formats. For example, finding the small field of view of a seeker in the larger field of view of an imaging acquisition aid system. It is also possible to perform correlation tracking of scenes until desired man-made targets reach identifiable size in the field of view, at which time such man-made targets may be automatically acquired and tracked.

DESCRIPTION OF THE PREFERRED EMBODIMENT

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
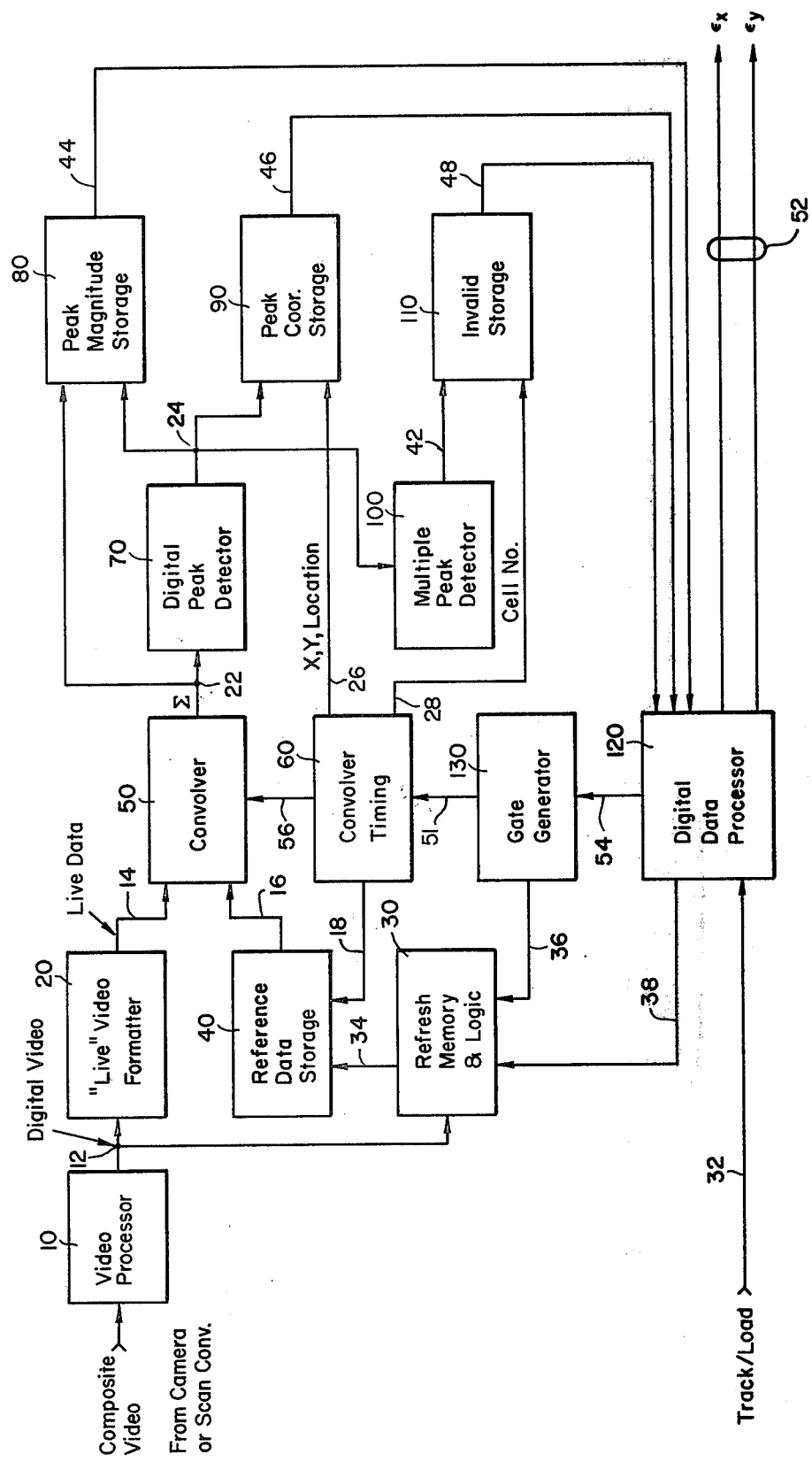
FIG. 1 is a conceptual schematic block diagram of the preferred embodiment.

Referring first to FIG. 1, a conceptual block diagram of a preferred embodiment, video from a sensor, not shown, enters the video processor 10, a two-level digitized video signal is derived from the video which presents a unique fingerprint for each scene being viewed. Digital video enters the live video formatter 20 which arranges the video signal in a bit stream suitable for sequential real-time processing. Digital video also enters its bit stream or selected portions thereof into the refresh memory and logic 30 where it is buffered for replacing those correlants in the reference data storage memory 40 which were found to provide correlation functions not qualifying in the subsequent validation test. Formatted live data then enter the "N" bit convolver 50 along with the reference data from reference data storage memory 40. The function of the convolver 50 is to determine, and output the degree of match between live data and reference data, that is, the correlation function. In one preferred embodiment, for example, N equals 64, so that the maximum number of matches is 64. A sum of all matches is computed every 217 nanoseconds, as determined by a master timer (FIG. 9) at a clock rate of 4.6 Mhz. The highest value of this sum, as determined by digital peak detector 70, that is, the correlation peak, is stored in the peak magnitude storage 80, together with its coordinates X and Y within its search area. These are placed in the peak coordinate storage 90.

Digital peak detector 70 also provides a search of each search cell for other peaks of either equal level or lower level by a fixed amount. If such ambiguities are present, as shown by multiple peak detector 100, the X, Y data from that particular cell will not be validated and this lack of validation will be stored in the invalid storage latch 110.

The digital data processor 120 performs all computations involving arithmetic, Boolean logic, and decisions. A preferred embodiment uses a programmable central processor unit, operating under command of an instruction set. Other embodiments may be constructed, such as, for example, a hard-wired logic version. The main functions of the digital data processor 120 include the performance of validation tests on all cell correlations by applying criteria which determine a level of confidence, according to peak to side-lobe plus noise, ambiguity, etc.; calculation of the global correlation coordinates from all valid local correlation peak coordinates. (The global correlation coordinates are determined either by simple averaging, first or second moments, or weighted combinations of several of these); control of the updating of correlants (or references) in invalidated cells. (This consists of selecting the most likely to match bit stream from the refresh memory, according to the location of well-matching correlants from valid cells); generation of gate coordinates in real time for gate generator 130; and housekeeping and timing functions for the correlator as a whole. Criteria for selection of the reference data are based on a desire for maximum uniqueness or minimum correlation ambiguity when the stored material is correlated against real-time data. Upon switching to a track mode, reference data update ceases, and the most recently stored reference data are frozen in the reference memory 40. Real-time digitized video is clocked through the convolver, in one embodiment, 64 bits at a time; and "Exclusive NOR" comparison is made in the convolver between the stored reference data and the clocked real-time digital video.

Referring still to FIG. 1, the video processor 10 which performs the function of converting raw, unprocessed video to two-level digitized video which has a uniquely coded relationship to the raw video from which it is derived is illustrated. In order to be useful in a correlator, the video processor needs the capability of extracting information from bland, relatively featureless scenes, in which prominent targets or other objects are not necessarily present. Therefore, conventional thresholding techniques which derive a threshold from target amplitude and background measurements and use the derived threshold to digitize a target in the scene are not applicable. In a sense, simple thresholding can be considered to be a form of analog-to-digital conversion with single bit amplitude resolution; if the video signal level is less than the threshold value, the digital video has a value of 0; if the video level is above threshold, digital video has the value 1.

Figure 2:
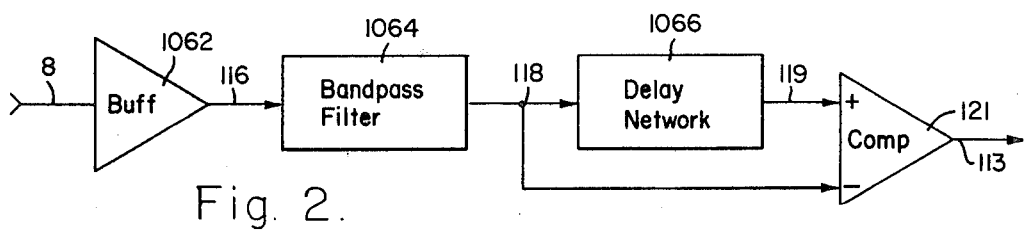
FIG. 2 is a block diagram of an embodiment of a self thresholding subprocessor such as would be used as element 10 of FIG. 2.
Figure 3:
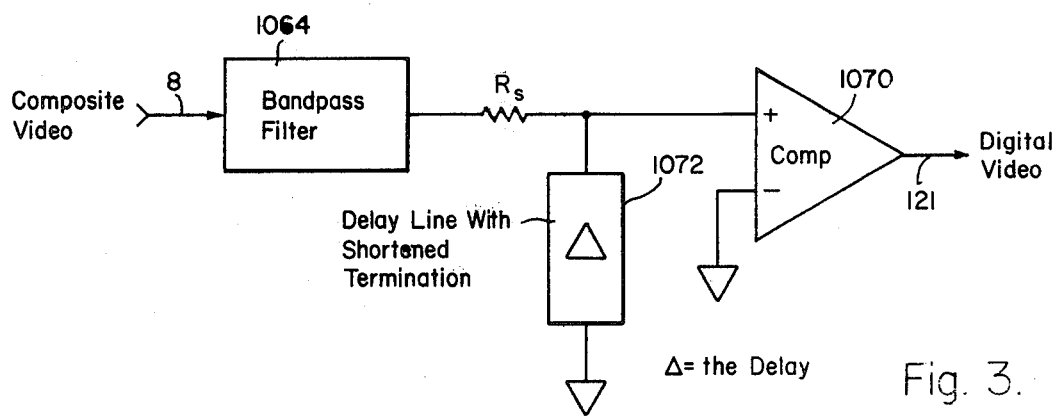
FIG. 3 is a block diagram of an additional embodiment of a self thresholding subprocessor such as might be used as element 10 of FIG. 2.

Two configurations of self thresholding video processors are shown in FIGS. 2 and 3. In FIG. 2 a buffer self-thresholding video processor is shown. Composite video on lead 8 is received by buffer 1062. The resulting limited video signal is furnished to bandpass filter 1064 on lead 116. The resulting band limited video is applied to delay network 1066 and comparator 121. Delayed video on lead 119 and undelayed video on lead 118 are applied to comparator 121 whose output is digital video. The digital video output of comparator 121 is furnished to the system on lead 113. A digitized video pattern results over the entire field-of-view, even in the absence of targets or other objects, provided only that scene contrast exceeds sensor coherent noise and random noise.

In the embodiment of FIG. 3, the "zero threshold" processor, the shorted delay line 1072 to ground acts as a quasi differentiator to the bandpassed video. The digital video corresponds to the zero crossings of the bandpassed quasi differentiated video signal.

Figure 4:
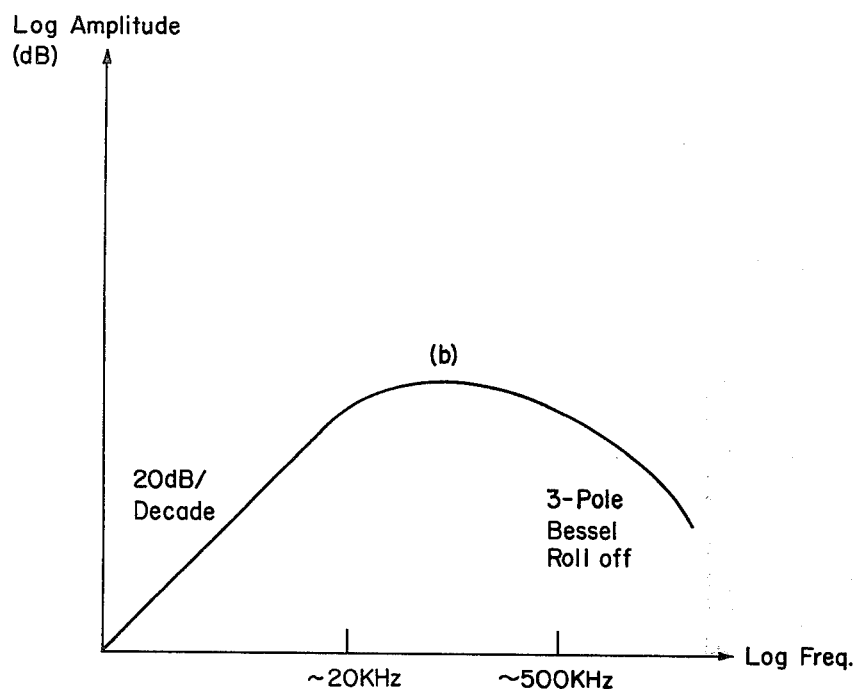
FIG. 4 is a frequency response curve illustrating output amplitude as a function of frequency for a three pole Bessel roll off filter.

A bandpass filter 1064 that has been used in the preferred embodiment with great success is known as a three-pole Bessel bandpass filter. FIG. 4 shows a frequency response curve for such a filter. Raw video from a camera or other sensor passes through a bandpass filter. The filter rolls off at low frequencies in order to attenuate low frequency components associated with sensor shading, scene shading, large-scene features, and sensor microphonic oscillations. As long as the rolloff starts at a frequency above the line-scan frequency (15.75 Khz), its value is not critical. The high frequency cutoff in the filter utilized is approximately 500 Khz. Values of cutoff between 100 Khz and 1 MHz were explored to find an optimum, but it was found that the cutoff frequency was not critical. The high end response is shaped by the Bessel filter chosen for its freedom from preshoot and overshoot and its linear phase response.

Figure 5:
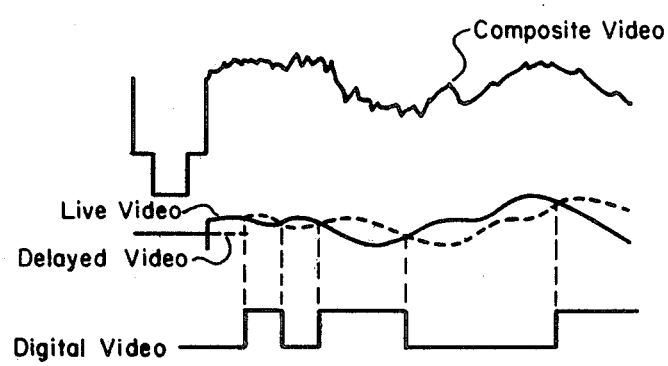
FIG. 5 shows curves representative of input video signal to the video processor of FIG. 2 and output digital video signal from the video processor.

Referring to FIG. 5, it is there illustrated how live video may be compared with delayed video in order to develop a digital video signal at the crossings. This technique provides a digitized video signal with a logic 1 and a logic 0 for approximately equal time from bandpassed video of most of the scenes. This is ideal for producing the correlation function, further, this form of digitization is sensitive enough to process very low contrast video almost independent of contrast levels and brightness. Experience with this video processor shows that it is relatively insensitive to scale factor changes in the video. The digital video pattern for a given video scene remains relatively invariant with video amplitude changes down to the level where noise becomes a significant factor.

Figure 6:
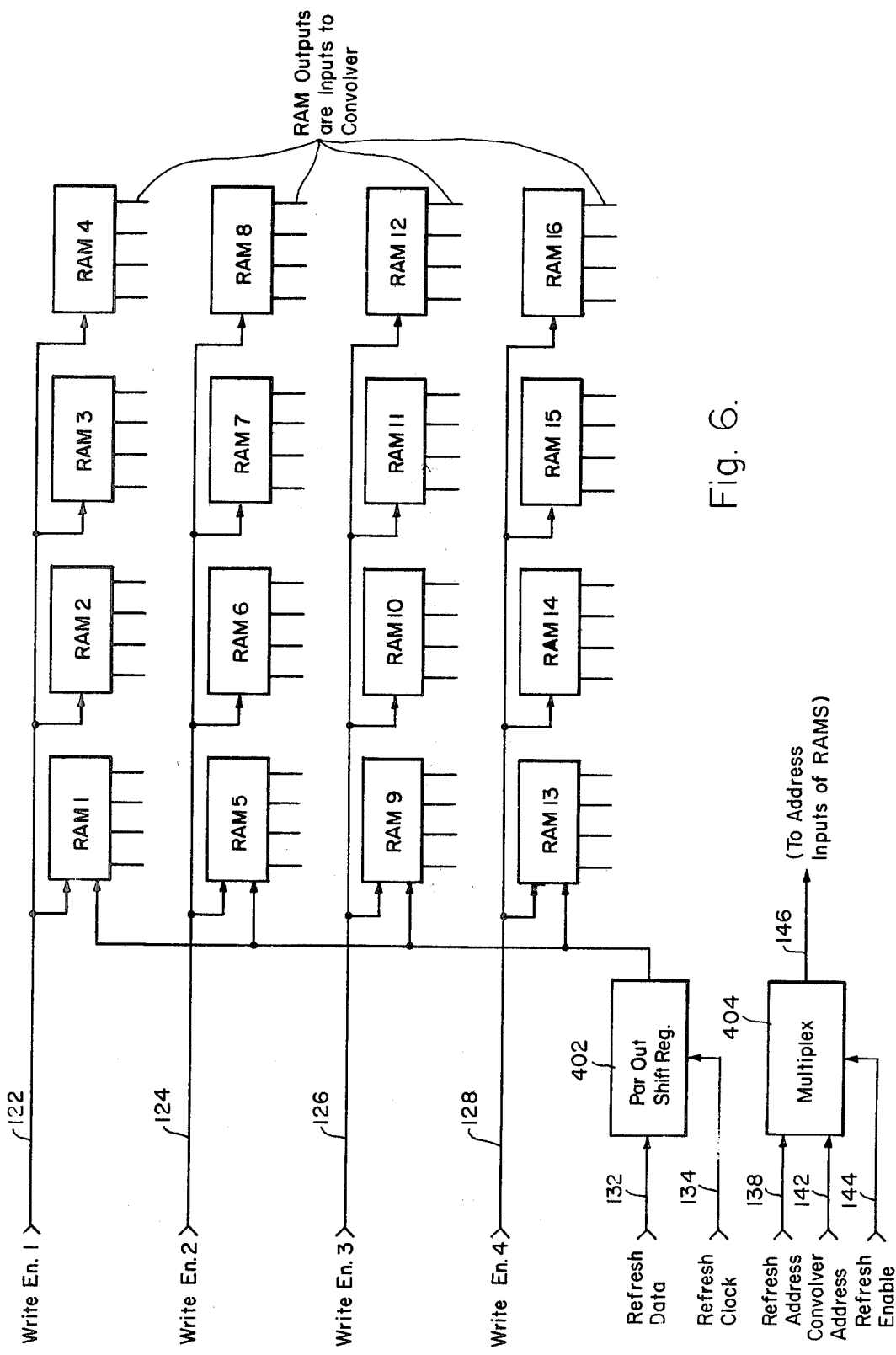
FIG. 6 is a conceptual schematic block diagram of the reference data storage element of FIG. 1.

Referring now to FIG. 6, the reference memory is stored in random access memory devices (RAMS). Any suitable type of memory and storage unit may be utilized such as integrated circuitry, magnetic memory, any dynamic-type memory or any of the other suitable types. The RAMS contain reference data for all of the search cells. The memory is updated by the digital data processor as required by the demand update logic. All the random access memory outputs are inputs to convolver 50.

Figure 7:
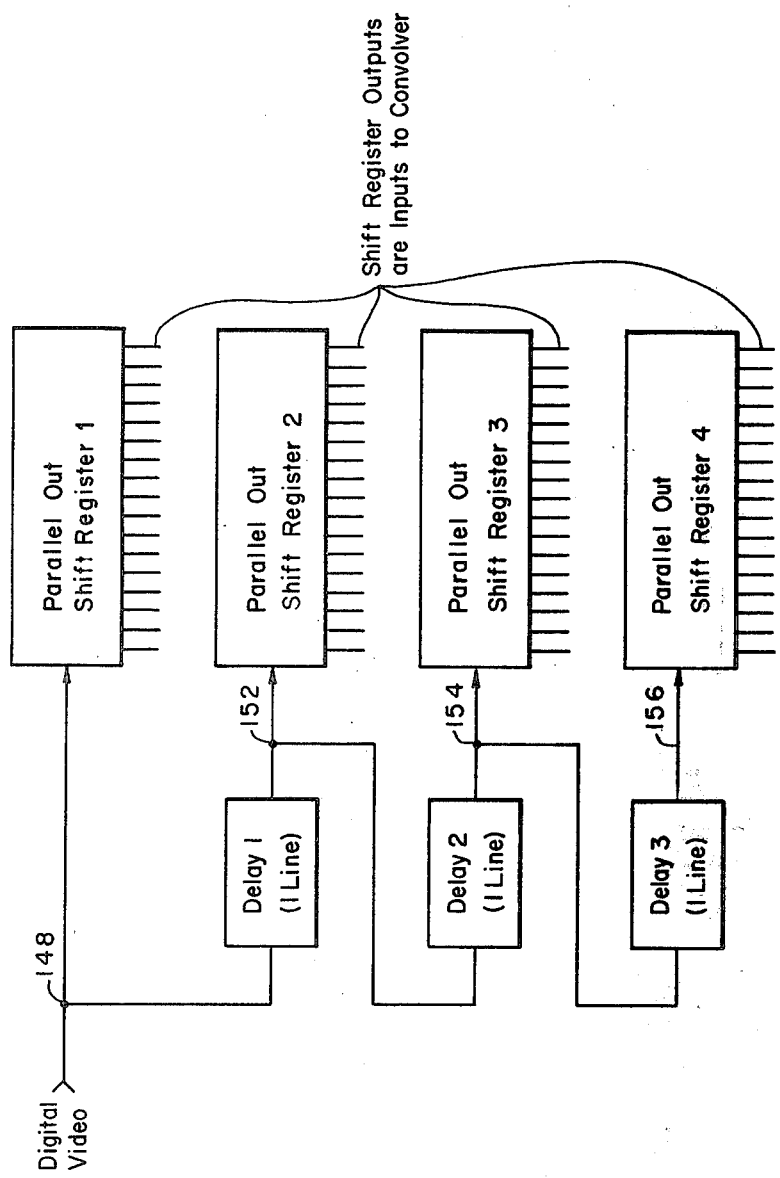
FIG. 7 is a conceptual schematic block diagram of the live video formatter of FIG. 1.

Referring now to FIG. 7, the live video formatter is illustrated. The convolver receives its live video information from the live video formatter. This live digitized video must be converted from its serial form to a form acceptable by the convolver. This is accomplished in the formatter whose block diagram is shown in FIG. 7.

Figure 8:
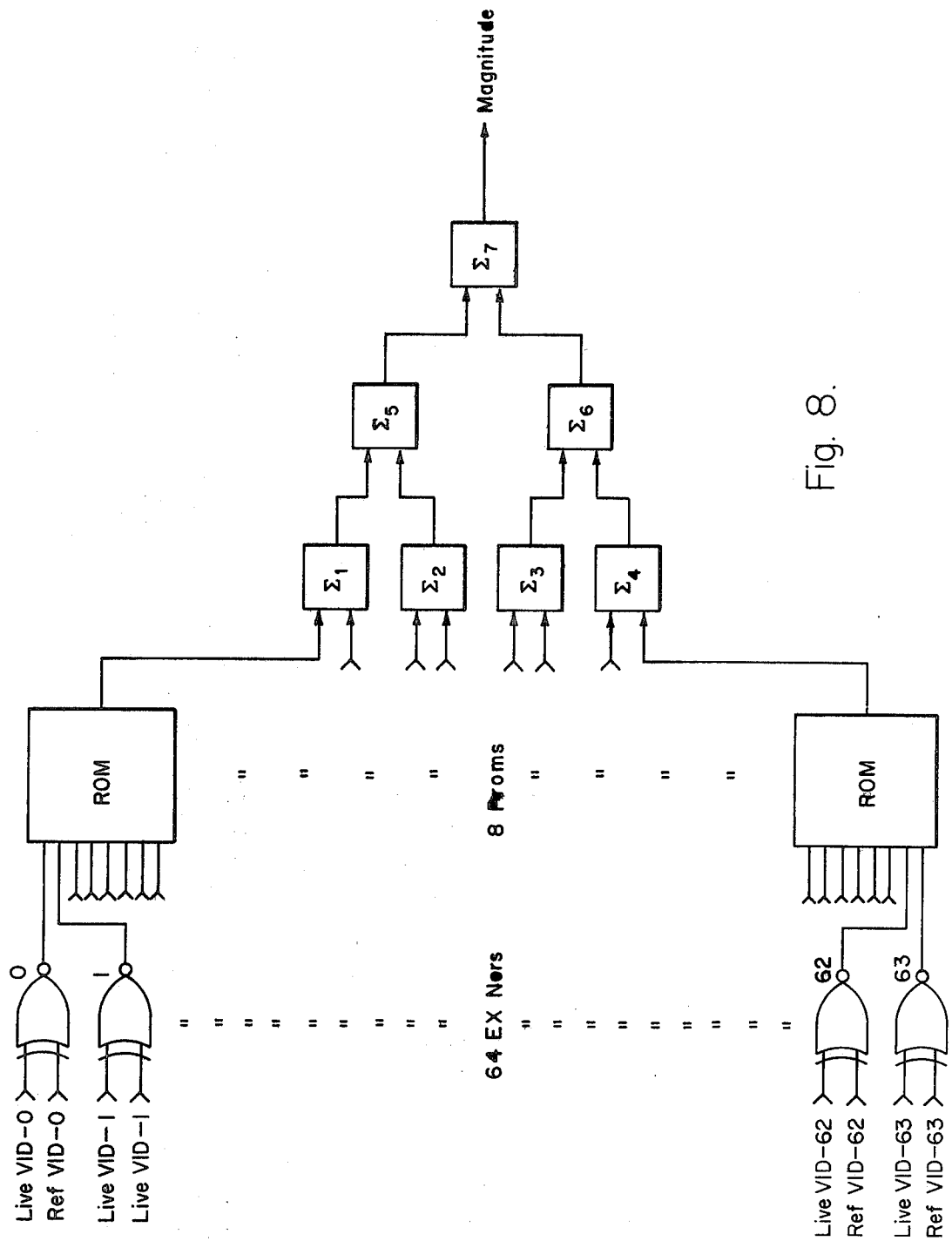
FIG. 8 is a logic schematic block diagram of the convolver of FIG. 1.

Referring now to FIG. 8, the operation of the convolver will be explained. The mathematical function of the convolver is to compare "live" digitized video (64 binary elements are shown for purposes of illustration) with the reference data, (also 64 binary elements), and output a binary number that is the sum of all matches between each of the comparisons. This is done every clock period (in the preferred embodiment, every 216 nanoseconds). Each binary element of live video and its corresponding binary element of reference data are inputs to an Exclusive NOR gate. The output of the Exclusive NOR gate is a logic 1 if the two inputs match and a logic 0 if they don't match. The rest of the convolver determines how many of the 64 Exclusive NORs have a logic 1 output (in the preferred embodiment). This is accomplished by first dividing the Exclusive NOR outputs into eight groups of 8. The eight inputs of each group are then applied to the eight address bits of eight 256×4 read-only memories (ROM). Here any suitable type memory device may be utilized such as for example integrated circuitry, magnetic memory, etc. The ROM is programmed so that its output is the sum of 1's on its address. The outputs of the eight ROMs are then summed two at a time with digital adders until the final sum is attained. The digital convolver is capable of very high speed operation. In the preferred embodiment it convolves two 64 element words (real-time live data against stored reference data) and derives a correlation sum (in the preferred embodiment, the sum represents the number of matched elements) every 216 nanoseconds.

In summary, the convolver comprises two basic functional components:

1. "Exclusive NOR" network; these devices detect a match between an element in the reference data work and an element in the live data word. Exclusive OR logic may be used alternately in order to generate a sum representing the number of mismatches.

2. Convolver summation logic; this logic performs a complete summing operation of matches in each subset of live data compared to the reference data.

During search of a particular live data search cell region by its associated reference, each computation of a new sum (matches) which is larger than all previously determined values during that search, results in a peak detector output which stores the X and Y coordinates of that newest peak value along with the value of correlation match.

Figure 9:
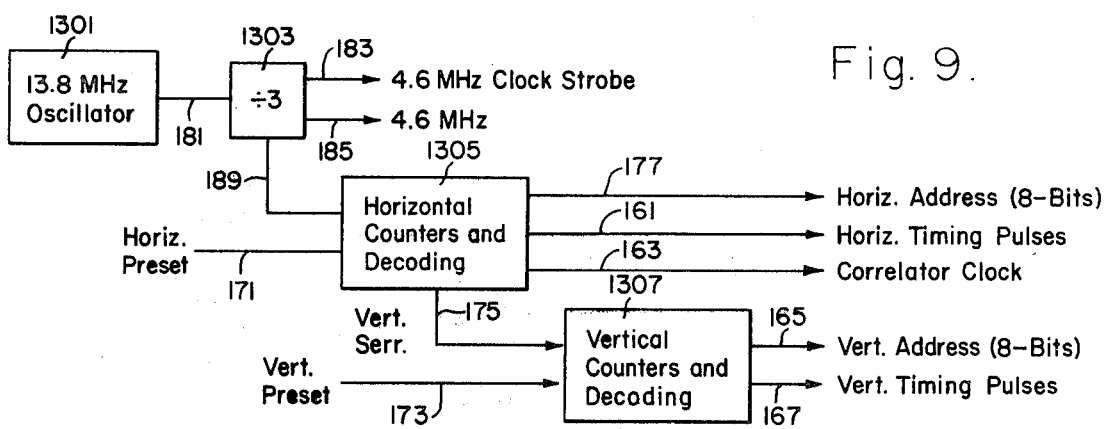
FIG. 9 is a conceptual block diagram of an exemplary master timer as might be used in the invention.

A master timer system such as used in the preferred embodiment may be as shown in the block diagram of FIG. 9. 13.8 Mhz oscillator 1301 supplies its signal by means of lead 181 to divide-by-3 circuit 1303 which puts out two 4.6 Mhz signals by means of leads 183 and 185. Another output of divide-by-3 circuit 1303 is supplied to horizontal counters and decoding system 1305 which also accepts horizontal preset signal by means of lead 171. Horizontal counters and decoding system 1305 outputs signal by means of lead 175 to vertical counters and decoding system 1307. Vertical counters and decoding system 1307 receives vertical preset signal on lead 173. Horizontal counters and decoding system 1305 outputs horizontal addresses on the lead 177, horizontal timing pulses on lead 161 and correlator clock signal on lead 163. Vertical counters and decoding system 1307 outputs vertical address signal on lead 165 and vertical timing pulses on lead 167.

Figure 10:
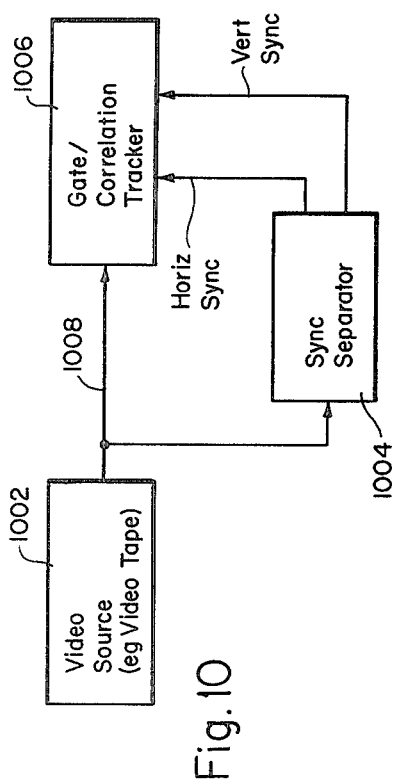
FIG. 10 is a block diagram exemplifying externally synchronized tracker operation.

Referring now to FIG. 10, operation of the invention from an arbitrary video source will be explained using a video tape as the arbitrary source. During operation of the invention from a video source such as a video tape recorder 1002, normal synchronization signals are not available. In processing such a signal, the incoming video signal from the video source 1002 is applied to a synchronization signal separator 1004 by means of lead 1008 so as to remove the video content and retain the horizontal and vertical synchronization intelligence. The thus separated horizontal and veritical synchronization signals are applied to gate/correlation tracker 1006 by means of leads 171 and 173 (as shown also in FIG. 9) respectively. Gate/correlation tracker 1006 is also responsive to the original video signal from video source 1002 appearing on lead 1008. Horizontal synchronization signal is applied to the master timer to preset the horizontal rate counters at the beginning of every scan line and vertical synchronization signal is applied to the vertical counters to preset the vertical rate counters at the beginning of every field time. As a result of the foregoing, the video source now generates timing signals which are received by the tracker and thus the tracker synchronizes its own internal timing functions to line up with those of the video source. It has been found necessary to implement such a scheme because so many video sources do not exhibit constant timing signals due to some disablement of the original incoming signal. In the selected case of a video tape, the timing signals occurring with the video signal outputs may not be constant. This inconstancy may be due to wow and flutter or just poor recording or poor quality of the original incoming signal. Since the timing may vary quite a bit, it is necessary to continuously preset the system timing counters on a line-by-line basis and a field-by-field basis to make sure that synchronization with the video source is maintained.

Figure 12:
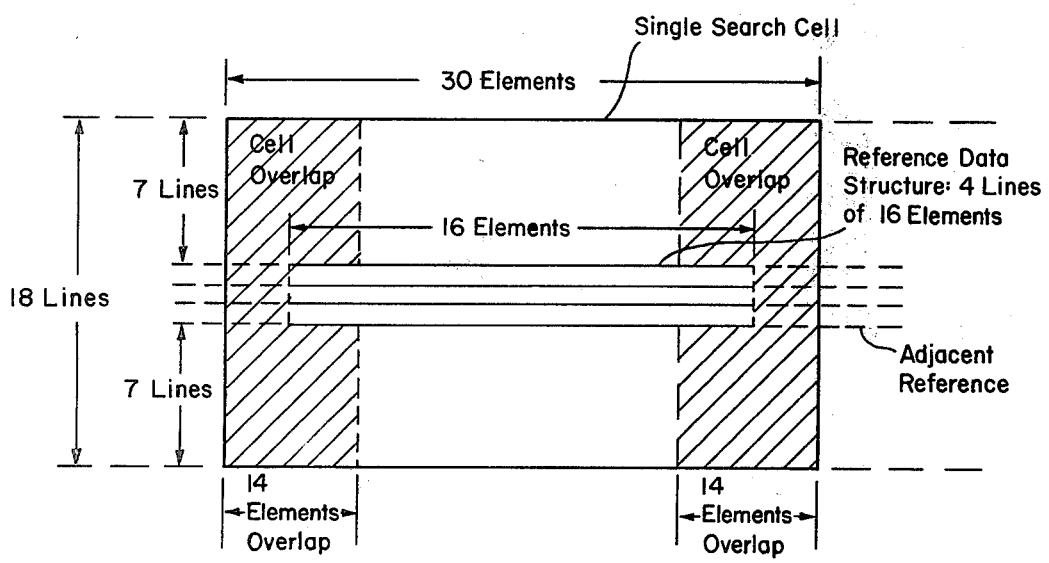
FIG. 12 is a diagram helpful in an explanation of the operation of a single correlation cell.
Figure 11:
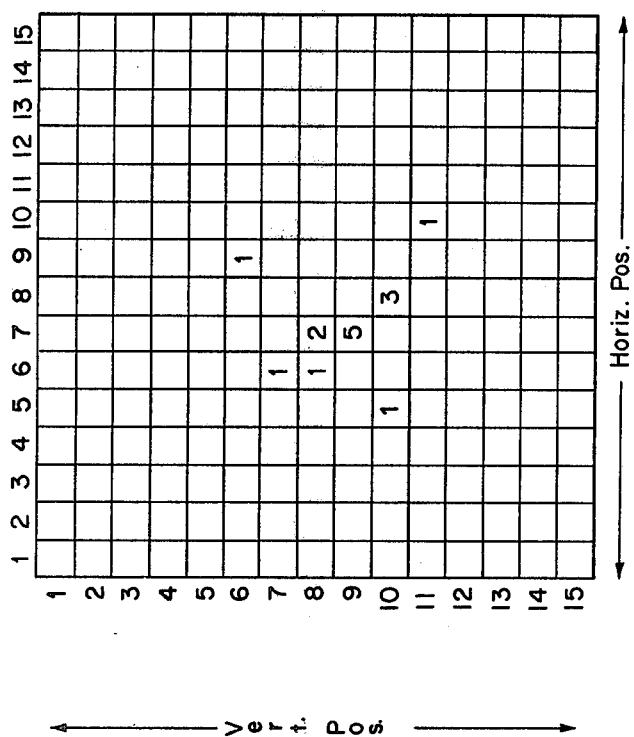
FIG. 11 is a diagram helpful in explaining the operation of the invention in which the numbers represent the number of cells with validated correlation peaks at a particular location. (For instance, the number 5 indicates that five cells have unique, validated correlation peaks at location (7, 9).)
Figure 13:
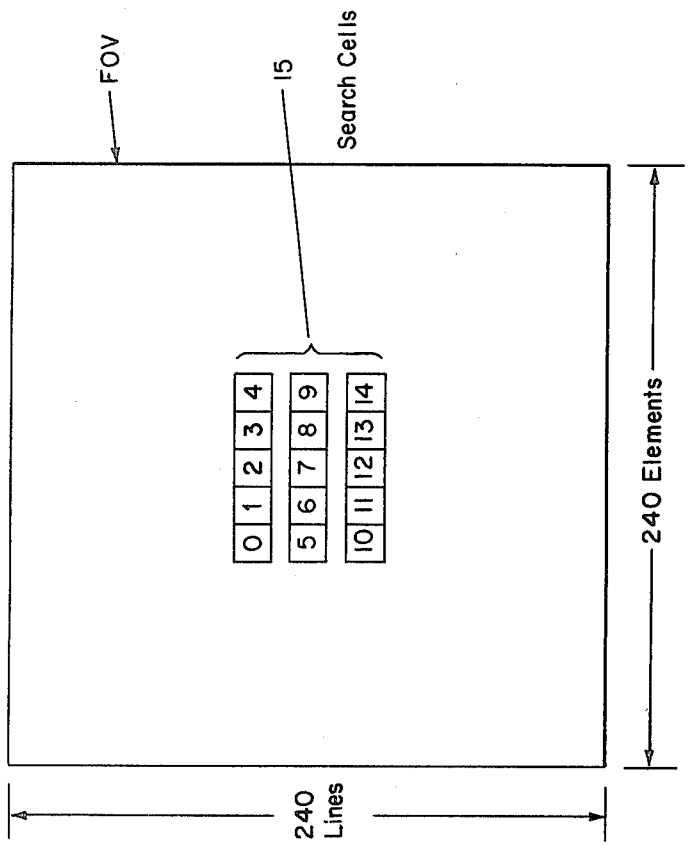
FIG. 13 is an exemplary conceptual diagram of a correlator cell configuration.

Attention is now directed to FIGS. 11, 12 and 13. The normal analog video signal from a sensor, i.e., TV camera, IR scanner, etc., is first "digitized" by the video processor into a two-level signal called digital video. The scene, that is, the field-of-view, is subdivided into regions or search cells as shown in FIG. 13 (15 cells are shown in this example). The digital video from the center of each region provides the reference which is stored in memory during the last scan prior to initiating the "track" mode. Live video of the subsequent scans in each region is then compared in real time with its corresponding reference. A correlation function is computed for each cell which is a measure of the degree of match (or mismatch) between the reference and live data. Validation criteria are applied to the correlation data to ascertain the usefulness of correlation information derived from the cell. Only displacements derived from validated cells are used for scene position computations. The data from those cells whose correlation function does not meet the requirements of the validation criteria are excluded from further processing. Moreover, the reference data of each invalidated cell are replaced, that is, updated with new digitized video data extracted from that video space which corresponds to the new scene position.

FIG. 12 shows a typical search cell structure with a 64 element reference (four lines of 16 elements each) in the center. In the present embodiment, the reference searches seven lines up, seven lines down, seven elements to the left and seven elements to the right. This means that the seach cell comprises an area of eighteen lines (4+7+7) by 30 (16+7+7) elements. For this particular implementation, the reference data for all the cells of a line are one continuous segment. Therefore, the horizontal search areas of adjacent cells overlap.

Vertically, the cell search areas are separated by one line. The placement of the cells and their respective overlap depends on the field of view, anticipated zoom rates and types of scenes, etc. As each cell searches seven elements to the left and seven elements to the right, a total of fifteen possible horizontal locations is visited. Likewise in a typical embodiment, there are fifteen possible vertical locations. FIG. 11 shows a matrix of these 225, (15×15) possible locations. The "best match" between the reference and live data must occur at one of these 225 locations. If the number of cells having "best matches" at each location is counted and these numbers written in the corresponding squares in FIG. 11, the matrix might appear as shown. This shows a typical correlation peak distribution pattern. Note that the total obtained by adding all the numbers in the squares is the number of valid cells for that scan. In the present embodiment that total can never be higher than 15.

Figure 14:
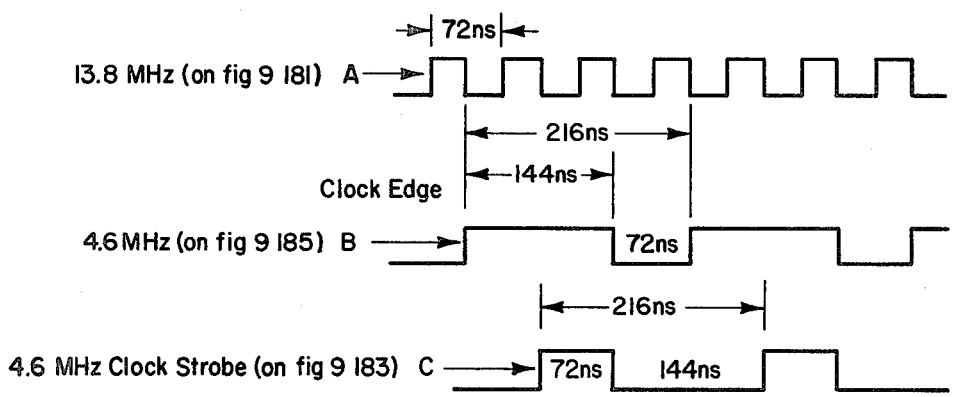
FIG. 14 is a timing diagram illustrating the signal output and sequence of events of a master timer as exemplified in FIG. 9.

In FIG. 14, square wave illustrations representative of the 13.8 MHz master oscillator A, along with the 4.6 MHz clock signal B, and the 4.6 MHz clock strobe signal C, are shown. These signals appear respectively on leads 181, 185 and 183 of FIG. 9. As shown, the periodicity of the 13.8 MHz signal A is 72 nanoseconds. There is thus as shown a total of 216 nanoseconds between clocks, that is, the rising edges of curve B, representative of the 4.6 MHz clock signal. The purpose of generating the clock strobe signal C and the clock signal B in the manner illustrated is as follows:

On the rising edge of the 4.6 MHz clock (referred to as the clock edge), counters are incremented and necessary functions are initialized as required. As a result of this sharp rise time, it takes a finite time interval for system elements to ripple and settle. A system settling time of 72 nanoseconds is allowed in a system representative of the invention for the purpose of allowing such transients to die down before attempting any data transfers. As shown in waveform C, immediately following the 72 nanosecond system settling time of waveform B, a 72 nanosecond-wide clock strobe signal is initiated. This 72 nanosecond clock strobe allows data transfer according to system requirements during that interval. The sharp fall time of the 72 nanosecond clock signal also causes transients to occur in the system and thus, the trailing edge of this signal is also followed by a system settling waiting time interval of 72 nanoseconds before the occurrence of the next system clock pulse as shown on waveform B. The duration of the clock signal B in this representative system is shown to be 144 nanoseconds while the interval between the pulses of this waveform is shown to be 72 nanoseconds. The duration of the clock strobe is shown to be 72 nanoseconds on waveform C, while the interval between pulses is shown as 144 nanoseconds.

Figure 15:
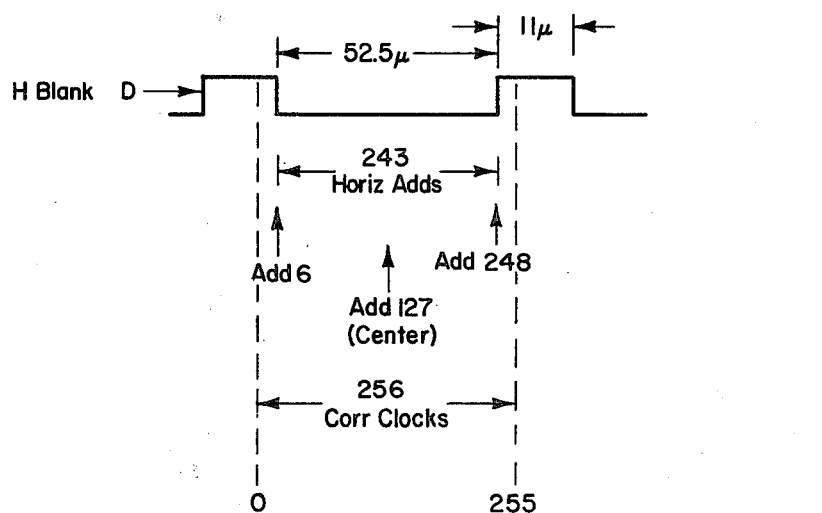
FIG. 15 is a timing chart showing representative horizontal and vertical blanking and address times as used in an embodiment of the invention.
Figure 15:
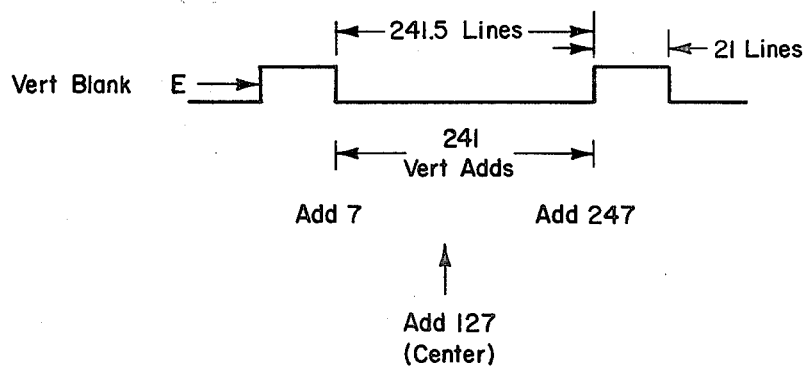

FIG. 15 is helpful in understanding the operation of the horizontal and vertical counters of FIG. 9. As shown, in horizontal blank waveform D, an 11 microsecond pulse is followed by a 52.5 microsecond interval before the occurrence of the next 11 microsecond pulse. The horizontal addresses, comprising a total of 243 addresses, lie in the 52.5 microsecond region as shown. The center position is shown as address 127. The first address is shown as address 6 and the last address is shown as address 248. Thus, horizontal addresses run from 6 through 248 and the center is 6+248=254 divided by 2 giving 127 as the horizontal address of the center. As indicated, there are 256 correlator clocks which begin slightly prior to and terminate slightly after the 52.5 microsecond period. The available addresses of the 256 correlator clocks are 0 through 255. This implementation is effected because of the existence of system delay lines in the correlator having exactly 256 clock counts applied to them so that there are 256 correlator clocks even though there are only 243 horizontal addresses.

Vertical blanking pulses occur as shown by waveform E and endure for an interval covering exactly 21 lines. Vertical address counters comprise 241 vertical addresses from 7 through 247 and again the center address is 127 so that the exact center of the display is defined as 127 horizontal address and 127 vertical address. In terms of lines, then, a vertical blanking signal of duration 21 lines is followed by an addressing interval of 241.5 lines before the occurrence of the next vertical blanking pulse. There are thus 525 lines per frame comprising 2×241.5=483 lines, since the display in the representative system is interlaced, plus 2×21=42 lines of blanking, giving the total of 283+42=525 lines as in conventional television displays. There are thus 241.5 active lines per field and 21 lines of blanking. However, during this time the system clocks out only 241 addresses since data are not processed on the half line.

The horizontal address counter is an 8-bit counter whose addresses run from address 0 through address 7 while the vertical address counter is also an 8-bit counter whose addresses run from address 0 to address 7. There is thus an 8-bit binary word defining the address of a vertical position and a like word defining the address of a horizontal position, that is, two 8-bit numbers uniquely define an exact point. There exists a total of 241×243=58,563 possible positions. The correlator, however, only actually searches a total of 225 positions per scan as is indicated by the 15×15 matrix of FIG. 11.

In forming a television display in the normal mode of operation of the invention, the tracker master timer sends out horizontal and vertical synchronization pulses to a television camera thus locking the synchronization circuits of the camera to those of the tracker. In conventional television camera equipment, the master oscillator frequency is 31.5 KHz and, therefore, the vertical serration pulse frequency in the system of the invention has been chosen as 31.4 KHz. However, to generate the digital coordinate structure of the system of the invention, a much higher frequency is required. This higher frequency is of the order of 4.6 MHz. In an embodiment of the invention, the 4.6 MHz frequency was multiplied up by a factor of 3 thus making the highest frequency in the system the 13.8 MHz occurring in the master oscillator of the tracker as shown in FIG. 9. In order to insure maximum system stability, it is only necessary to count down from the 13.8 MHz frequency to the requisite 31.5 KHz frequency and then apply that 13.5 KHz frequency to a conventional television camera to be used with the system. Thus the television camera will be locked to the timing systems of the invention.

Figure 16:
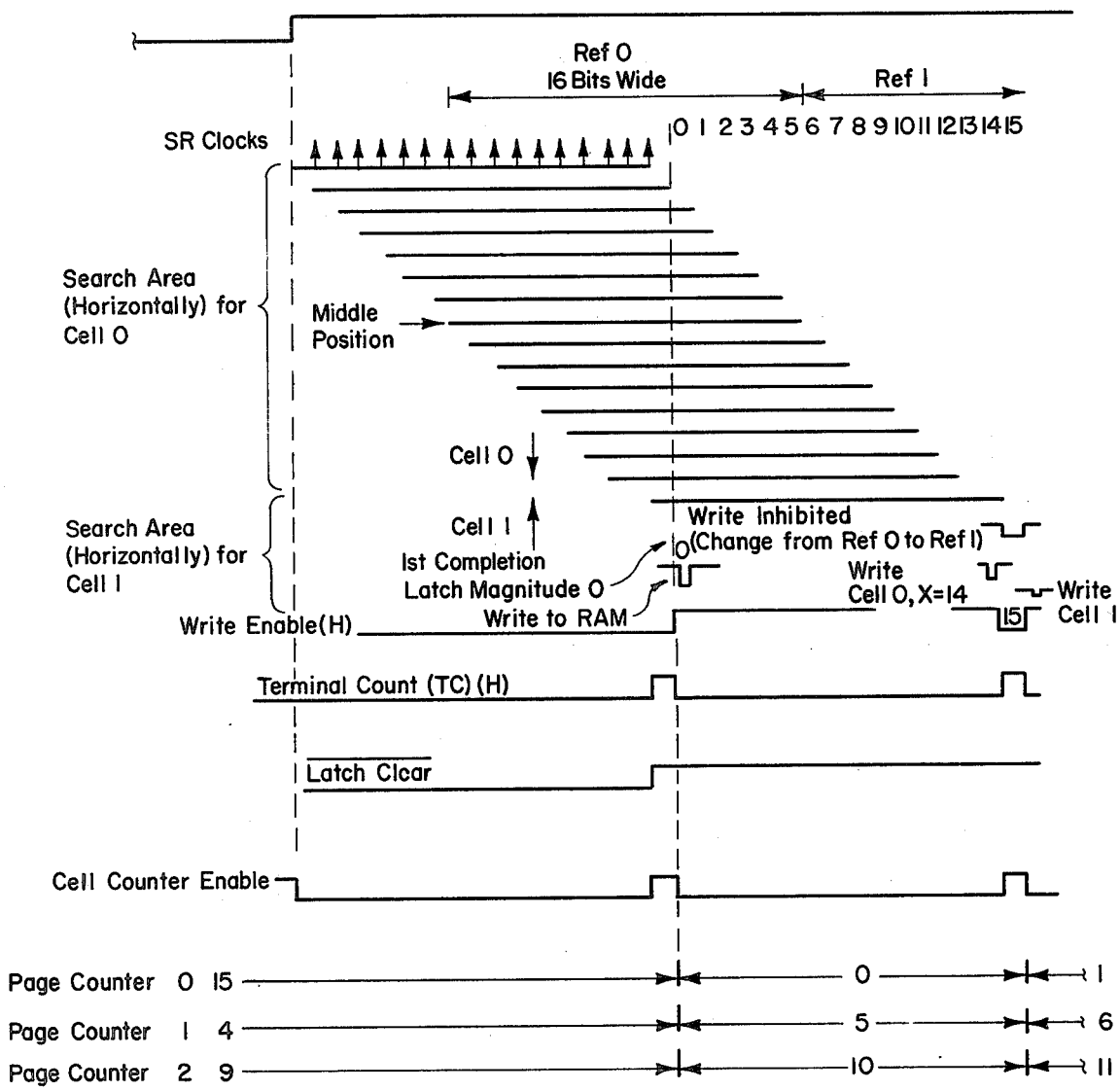
FIG. 16 is a timing chart helpful in an understanding of the sequence of events occurring in the correlator of an embodiment of the invention.
Figure 17:
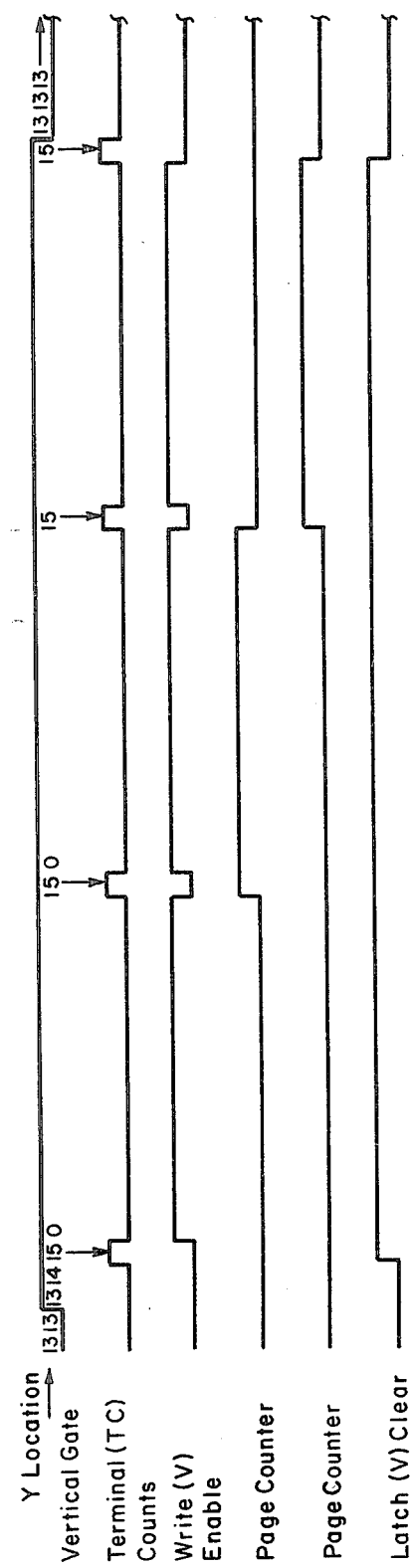
FIG. 17 is a timing chart helpful in an understanding of the sequence of events occurring in the correlator of an embodiment of the invention.
Figure 17:
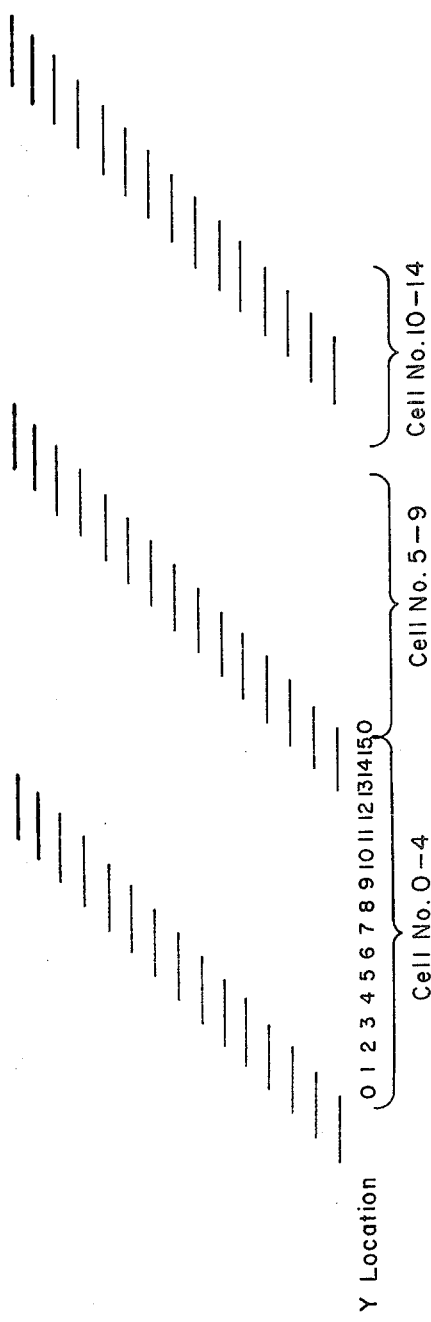

Referring to FIGS. 16 and 17, the timing waveforms illustrate the operation of the correlator timing. The number of shift register clocks (SR) required to clock the live data into the shift registers is 16 in this particular configuration. On embodiment has a correlator cell organized as a reference of 16 bits wide by 4 lines high, therefore, 16 shift register clocks are required to load up one set of data horizontally but it is necessary to also have clocked down 4 lines in the vertical dimension in order to be able to perform the first correlation. After clocking down 4 lines, i.e., on the 4th line, and after the 16th clock count, the last piece of data is clocked into the shift register and the system is ready to make the first magnitude measurement. A system delay of one full clock period after the 16th shift register clock allows the correlator to compute the current magnitude. At the end of that delay time period, that magnitude is clocked into a storage latch. The output of the storage latch is then compared to a previously found peak value of magnitude for that cell. It is necessary initially, to set the magnitude of the peak detector equal to zero prior to the first convolution in order to obtain the true peak value for that cell. If the peak detector initially contained any number other than zero, it would be possible subsequently to insert a misleading magnitude into the peak detector. In summary, it is necessary to come down 4 lines of 16 clock counts each. At the end of the 16th clock count, the last piece of data is shifted into the shift register, the system is delayed one full clock time while the convolver computes the first magnitude, and then that magnitude is transferred into the peak detector data storage. On subsequent scans, another piece of data is clocked into the shift register, the oldest piece of data in the shift register just "falls off" the end and is lost, another piece "falls in" and we now have 16 new pieces of data, (actually, 15 which were used once before, plus a new one). The next magnitude measurement is now made, and after the one clock period delay, that magnitude is latched and compared to the previously stored peak value. If the latched value is greater, that magnitude is clocked into storage. At the same time that any magnitude is clocked into storage in the peak detector, the coordinates, both X and Y, of that value are also stored with it. Thus, after the system has processed the 225 possible positions for any given cell, there are three numbers for that cell stored in memory. The memory now contains the peak magnitude, which represents the value of the correlation magnitude that was found to be greatest during that search area of 15 positions horizontally on 15 positions vertically, and the X and Y coordinates of where that peak was found to be. After thus processing all 15 cells, there will be stored in memory and accessible by the computer, 15 different magnitudes, and 15 X locations and 15 Y locations, which define where the 15 peaks were found to be. In addition, there are two validation criteria used to determine "good" peaks. First off all, correlation magnitude for a good peak must be above a minimum threshold. That minimum threshold can be controlled by the computer or it can be a dynamic number. In addition, if multiple peaks are found, that is, if there exist two peak values of the same magnitude in a given cell, it cannot be determined which is really the correct one, therefore that cell will be invalidated. Once these 15 peaks have been found, not all of which are necessarily valid, the valid peaks are further processed to compute a "best estimate" of where the scene has moved from the previous scan.

In view of the above, it is evident that for each of the 225 possible positions (FIG. 11) within a given search cell there is a corresponding horizontal address and vertical address set (FIGS. 9 and 13) for data applied from the sensor, that is, the correlation sum for a given search cell position is always produced during the time of occurrence of a particular sensor date horizontal and vertical address set. Convolver timing unit 60 of FIG. 1 responds to said sensor horizontal and vertical addresses for providing, in accordance with a fixed, preselected relationship, the cell number and the relative position within the search cell (X and Y location) currently being processed. For example, unit 60 could convert a sensor field address such as line 120 and element 120 (FIG. 13) to a search cell address such as cell 7, position 8, 8 (FIGS. 11 and 13).

Convolver timing unit 60 applies, on a lead 18 (FIG. 1), the cell number to reference data storage unit 40, which unit responds to the cell number so as to provide the proper reference data set to convolver 50, that is the reference data set which is associated with the search cell currently being processed. Similarly, convolver timing unit 60 applies on a lead 56 the cell number to convolver 50 which in turn applies said information in conjunction with the computed correlation sum to digital peak detector 70. Detector 70 uses the cell number information to process the sum correlation information for each of the respective search cells in accordance with the hereinabove outlined criteria; for example, to determine which X, Y position within each search cell has the largest correlation sum. As indicated previously, as each search cell position is processed, the X, Y coordinate information (FIG. 11) associated therewith is applied to peak coordinate storage unit 90 on a lead 26 so that the location within a cell of the correlation peak may be identified; and the cell number is applied on a lead 28 to invalid storage unit 110 so that those cells whose correlation values do not meet preselected criteria may be identified, e.g. two correlation peaks above a given value for a single search cell.

In another embodiment of this invention, all the magnitudes for all 15 cells are stored. Thus, 225 magnitudes are stored for each of 15 cells. No validation criteria are performed on these data other than the requirement that it be above a certain minimum magnitude. These magnitudes can run, for example, from 0 to 64 in one embodiment. If, for example, we arbitrarily choose the number 32, any time there is observed a magnitude which is equal to 32 or greater, that value will be stored in memory. In this embodiment the centroid is computed for each cell of the correlation surface that lies above this magnitude, in this case, the number 32. In this implementation, if multiple peaks are found in a cell, it doesn't matter. The centroid is computed for each one of the cells, and the X and Y location for each of the 15 cells along with their centroid computations is used to find out where the scene has moved. A major advantage of using centroid information is, there are more data to work with vis-a-vis one single peak value. It is an integration process that is utilized to generate the centroid. There is thus a tendency to smooth the data, there is lower noise in the output answers than with single points, and greater accuracy is realized. With only one point, resolution is at best to one bit. When a centroid is actually computed, there is a division of a cumulative sum of moments, a moment being defined as the X or Y position multiplied by the magnitude. That sum is divided by the cumulative sum of magnitudes and this then is the centroid. When the division is done, it is unnecessary to stop at merely rounding off to the nearest bit, several bits of sub picture element can actually be maintained. Tests in the lab have demonstrated that this fractional accuracy is valid information. Therefore, instead of only being able to estimate the position of the correlation peak to the closest bit or line, (X and Y), it is possible to actually get two or perhaps three bits of sub picture element resolution such that a final answer is obtained by combining the results of all 15 cells. The answer obtained will be better than just within one line or within one picture element, making possible more accurate tracking and also lower noise tracking.

To recapitulate, two methods have been described. There is the peak detection mode where the effort is to find the single peak for a given cell. There may be as many as 15 peaks if all cells are valid. Any cell that has two peak values in different locations will be invalidated. In the second embodiment, single peaks are not evaluated, but all magnitudes which are above some threshold are considered. The centroid of that resulting surface is computed to some sub picture element resolution and this centroid forms the basic data form utilized. The validation criterion used in the embodiment where the centroid computations are performed, is an examination of the total magnitude. Now the total magnitude is the cumulative sum of magnitudes above the threshold. This sum, if found to be greater than some predetermined number, indicates that there exists a reasonably good correlation surface somewhere in that cell.

Still referring to FIGS. 16 and 17, the operation of the timing in an operational embodiment is as follows. After entering the horizontal correlator gate, at the end of the first clock count, there will be one piece of data clocked into the shift register. The process will continue until there is a total of 16 bits of data clocked into the shift register. This is shown as clock 16 on the shift register clock. At the end of this time there are 16 pieces of live data, that have been clocked into the shift register. The convolver now compares that 16 bit grouping to the 16 bits of reference data on that particular line that's stored in reference memory. Since coming down a total of 4 lines, there are 4 lines of data also available. There is a current line and 4 lines of delayed data. That presents a total of 64 possible pieces of data to the convolver. At the end of the 16th clock count of the shift register, the convolver makes its first summation, there is a one full clock period delay, then the result of the magnitude summation is clocked into a latch. There is then a one-third of a clock period delay, or 72 nanoseconds, then these data are strobed into a latch if the magnitude is greater than the stored magnitude, from the peak value of that cell that is being searched. Again, initialization is accomplished by clearing that magnitude of the peak detector at the beginning of the interrogation of every cell so that there is only the peak value of that cell on that particular scan. The drawing also shows a total of 15 possible positions that can be searched for each cell. The addresses can run horizontally from 0 to 14. When address 15 is reached, the write is inhibited, the reference data are changed to the next cell, and on the next clock count the start is at horizontal address 0 again but there is a different cell number. The process is then repeated for each of the cells on that line. The result is that after going through with the horizontal correlator gate, there have been recorded magnitudes for the first vertical search position for five different cells. There are 15 different search positions to be found vertically, thus the system searches a total of 15 positions on each of 15 vertical positions or a total of 225 possible search positions. At the end of the vertical correlator gate all 15 cells have been searched, that is, 225 positions for each of those cells have been searched or interrogated. The system has now either stored the magnitudes, in the case of the embodiment implementing the centroid computation for each of the positions only in magnitudes above threshold, or the peak value for each of the 15 cells has been found, peak value being the magnitude and the X and Y location plus an indication of whether or not the resulting measurement is invalid or valid. If the measurement is invalid that indicates the same peak magnitude occurring twice in a cell on different locations.

When terminal count goes high for the first time inside the correlator gate, then, on the next clock count the horizontal write commands are enabled but whenever terminal count horizontal goes high the write command is inhibited. The clear is removed from the magnitude latch at the same time terminal count goes high such that on the next clock count the first magnitude can be clocked into the convolver latch. A cell counter enable is provided to increment the counter so as to permit counting from cell zero to cell 1 to cell 2, etc., for the first page, or from cell 5 to cell 6 to cell 7, etc. for the second page, or from cell 10 to cell 11, etc. for the third page. The page counter is used to preset the cell counter such that at the end of the first cell counter enable, during horizontal correlator gate, counting begins from whatever the preset condition was, either 15, 4 or 9. The counter is incremented to give the cell address 0, 5 or 10 depending upon which page is under consideration.

Referring to FIG. 17, the operation in the vertical direction is very similar. The system must process 4 lines before the first magnitude is available, i.e., the first allowable magnitude occurs, at the 4th line. At the 4th line the write is enabled. The write is enabled for a total of 15 different lines, then on the 16th line, which has vertical address 15, the write is inhibited and at the same time the page counter is incremented, so the page counter goes from 0 to 1 to 2, and those values are used to preset the counters to give the correct cell address location for a given page. The latch clear signal is provided in conjunction with the horizontal latch clear signal, also shown on FIG. 16, to prevent the correlation magnitude from being latched into the convolver latch until such time as the system is ready to make magnitude summations. Whenever terminal count 15 occurs vertically, zeros are written to every one of the locations of that group of 5 cells.

Figure 18:
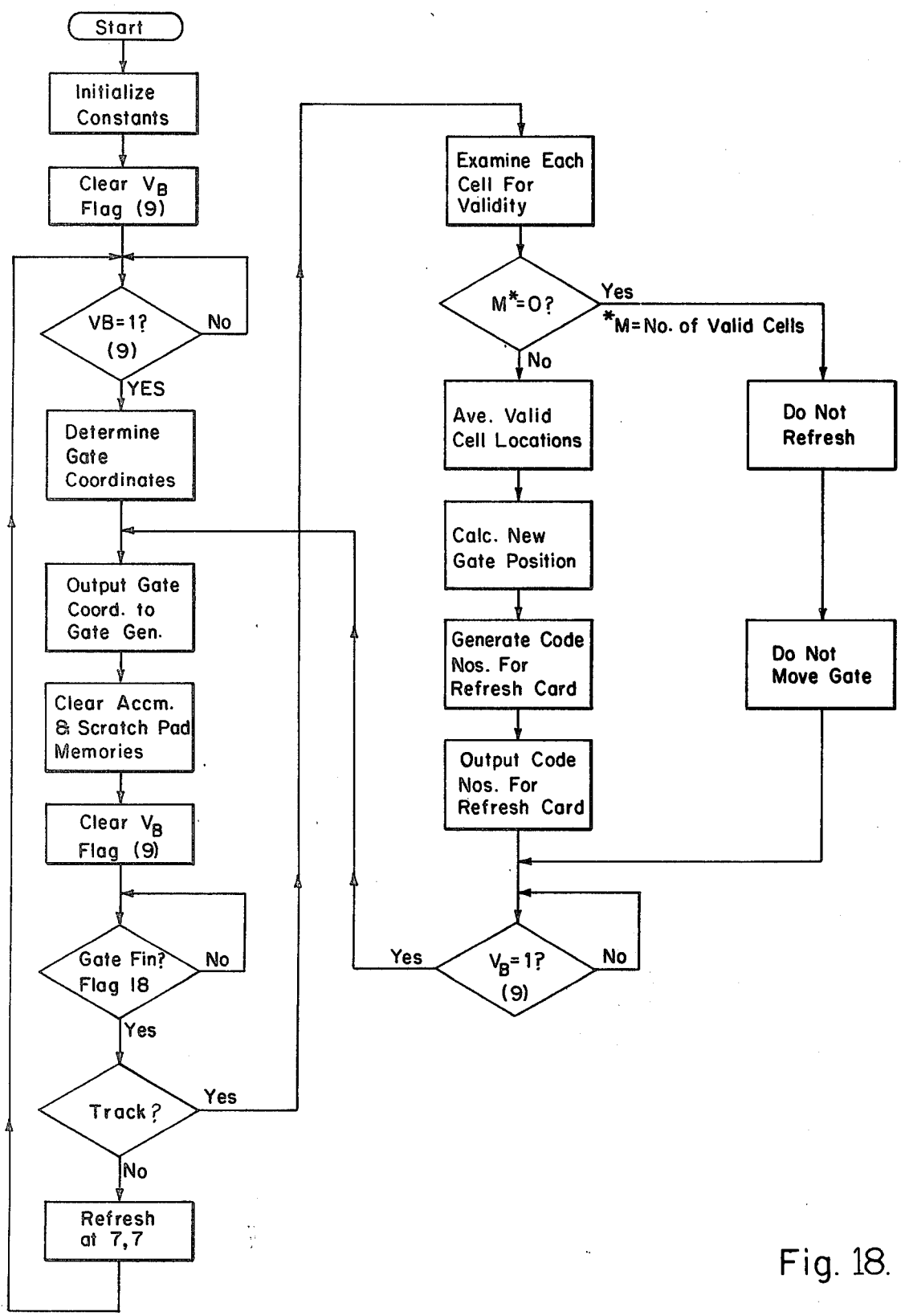
FIG. 18 is a simplified flow chart showing an exemplary mechanization of a stored program for use with an implementation of this invention.

FIG. 18 is a simplified flow chart implemented in the preferred embodiment by means of the appended computer program. Reference to both FIG. 18 and to the appended print out is now invited for an explanation of the regular routine affected by the central processing unit (CPU).

The program starts out by loading the proper constants into certain operand memory locations. Then since the vertical blank (flag 9) may be in the high state at power turn on, this flag is cleared. Assuming that the correlator is in the "LOAD" mode at power turn on, the correlator gate coordinates are calculated either by assuming that they are centered in the field-of-view if the correlator is working by itself, or slewed to the tracker center lines if the correlator is interfaced with a gated video tracker.

For display purposes, the gate coordinates are loaded to the gate generator only during vertical blanking time. Then the accumulators and scratch pad memories are cleared so as not to interfere with the next field's calculations. After this is done, the CPU is ready for the next field.

At the end of the correlator gate, (signified by the energizing of flag 18), all the cells are refreshed automatically from the data in the center of each cell if the correlator is in the "LOAD" mode. This means that the correlator is always loaded with data obtained from the field just before the correlator went into "TRACK".

In the "TRACK" mode, the data that are obtained during gate time are transferred to the CPU after flag 18 occurs. Each cell is then examined for validity by verifying that the correlation peak is above a certain minimum number. Since the multiple peak detection is done in real time, if a multiple peak is detected in a certain cell during gate time, the hardware inputs a number to the CPU that is lower than the minimum acceptable level. This automatically invalidates the cell.

After each cell has been examined for validity, a test is made to verify that there was at least one valid cell during that field. If there are no valid cells, that means that something went drastically wrong. Thus, the reference data are held as is, and the gate position is frozen in hopes that the data will correlate on the next field.

However, in normal operation, most of the cells will be valid. Thus, since it is possible to have 15 different correlation locations, the answers from the valid cells are averaged. This average is used to position the gate over to where the scene has moved, and also to tell the refresh logic from what locations to refresh.

During vertical blanking time, the coordinates of the all accumulators and scratch pad memories are cleared.

There has thus been described a scene tracker for use with imaging or quasi-imaging sensors such as television cameras, forward looking infra-red sensors, millimeter wave scanners and the like. It has been shown that the scene tracker of the invention has the capability of extracting information from bland, relatively featureless scenes in which prominent targets are not present. It is thus possible with the invention to perform correlation tracking of scenes with video amplitude variations only slightly larger than the noise level of the system.

What is claimed is:

1. A scene tracker system adapted for responding to sequentially applied fields of data each of which are definitive of a scene within a field of view, so as to provide global correlation coordinate signals which are indicative of the relative spatial displacement between scenes defined by different fields of data, said system comprising:

reference date storage means for storing reference cell data from a preselected plurality of portions of one field of data;

means for correlating the data for each reference cell against data for an associated search cell, with the data for each associated search cell being derived from a portion of a subsequent field of data which encompasses the relative position of the associated reference cell; and for providing local correlation coordinate signals indicative of the relative location within each search cell of the correlation match between each search cell and its respective reference cell; and processor means for processing said plurality of local correlation coordinate signals so as to produce as a function thereof global correlation coordinate signals which are indicative of the relative spatial displacement between the scenes defined by said one field of data and said subsequent field of data.

2. The system of claim 1 wherein said reference data storage means comprises a plurality of random access memory devices.

3. The system of claim 1 wherein said means for correlating, receives reference cell data signals from said reference data storage means for correlating with video signals from the currently applied field of data, said means for correlating comprising:

a multiplicity of Exclusive NOR circuits, each receiving video signals from the currently applied field of data and a reference cell data signal;

a plurality of read-only memory devices, each responsive to signal output from a predetermined number of said Exclusive NOR circuits; and a plurality of digital adders responsive to output signals from said read-only memory devices and developing therefrom a correlation function.

4. The system of claim 1 wherein said means for correlating includes a stored-program central processing unit.

5. The system of claim 1 further comprising means for detecting correlation matches which are indicative of greater than a preselected degree of correlation and for excluding from use in the production of said global correlation coordinate signals, local correlation coordinate signals derived from respective search cells in which multiple correlation matches of greater than said preselected degree are detected.

6. The system of claim 5 further comprising means for updating the reference cell data associated with respective search cells having multiple correlation matches of greater than said preselected degree of correlation.

7. The system of claim 1 further comprising a self-thresholding video processor for digitizing said sequentially applied fields of data prior to their being processed by said reference data storage means and by said means for correlating.

8. The system of claim 7 wherein said self-thresholding video processor comprises:

buffer means for receiving and buffeting video signals which comprise said fields of data bandpass filter means for receiving and bandpass filtering said buffered video signals from said buffer means;

delay network means for receiving and delaying said bandpass filtered video signals from said bandpass filter means; and comparator means for receiving and comparing delayed video signals from said delay network means with undelayed video signals from said bandpass filter means.

9. The system of claim 8 wherein said bandpass filter means is a three-pole Bessel bandpass filter.

10. The system of claim 7 wherein said self-thresholding video processor includes a zero threshold processor which comprises:

bandpass filter means for receiving and bandpass filtering video signals which comprise said fields of data;

shorted delay line means for quasi differentiating said bandpass filtered video signals; and comparator means for receiving the bandpass filtered and quasi differentiated video signals and comparing them with a reference input signal.

11. The system of claim 7 wherein said bandpass filter means in a three-pole Bessel bandpass filter.

* * * * *